FRICTION CLUTCH WITH TORQUE RESPONSIVE LOCK
Filed Feb. 17, 1956 2 Sheets-Sheet 1
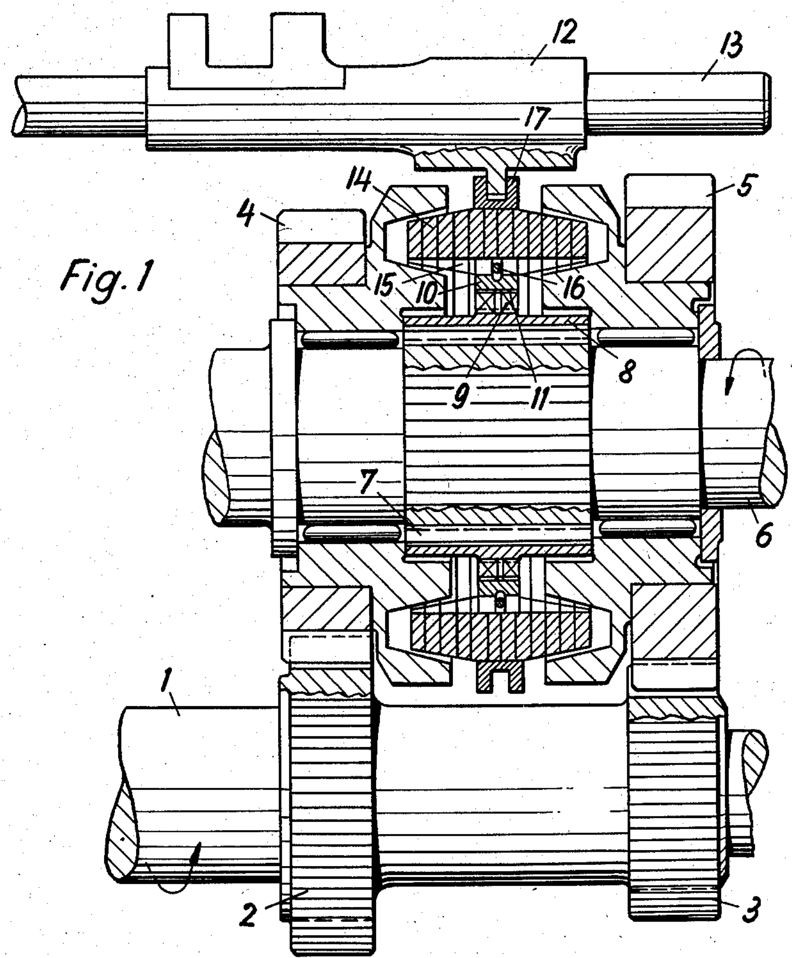
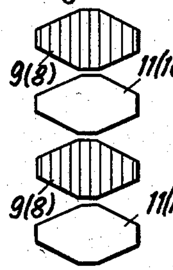
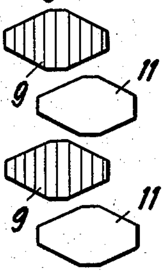
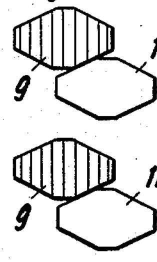
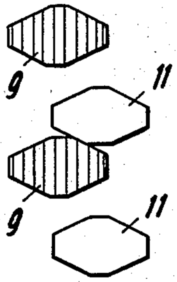
INVENTOR
WERNER E. ALTMANN
BY Dicke and Craig.
ATTORNEYS.

Feb. 24, 1959 W. E. ALTMANN 2,874,817
FRICTION CLUTCH WITH TORQUE RESPONSIVE LOCK
Filed Feb. 17, 1956 2 Sheets-Sheet 2
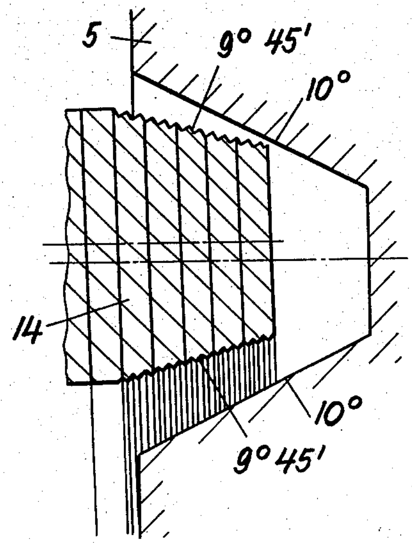
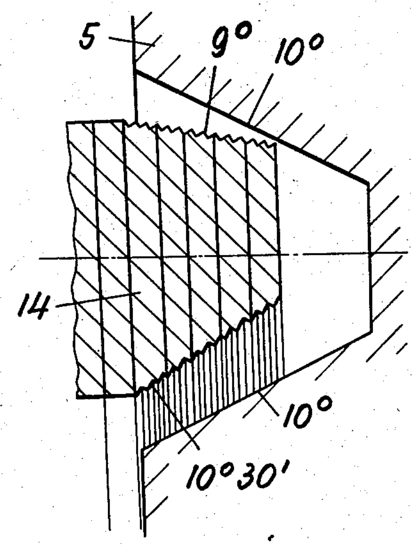
INVENTOR
WERNER E. ALTMANN
BY Dicke and Craig
ATTORNEYS United States Patent Office 2,874,817

Patented Feb. 24, 1959

1

2,874,817

FRICTION CLUTCH WITH TORQUE RESPONSIVE LOCK

Werner E. Altmann, Stuttgart, Germany, assignor to Daimler-Benz Aktiengesellschaft, Stuttgart-Unterturkheim, Germany Application February 17, 1956, Serial No. 566,258

Claims priority, application Germany February 23, 1955

13 Claims. (Cl. 192—114)

The present invention relates to a new type of friction clutch, particularly for automobiles, wherein one clutch member may be shifted in an axial direction to engage by friction with another axially stationary clutch member.

It is an object of the present invention to provide a friction clutch in which the torque is transmitted from the shiftable clutch member to the axially stationary member by means of a plurality of interengaging jaws on the shiftable member and on an axially stationary member which carries the shiftable member and transmits the torque, wherein these jaws are provided with surfaces which are parallel in the axial direction and continue in inclined surfaces so that, when the clutch is in the disengaged position, the axially parallel surfaces of the jaws engage each other, while when the clutch is in engaged position, the inclined surfaces of the jaws engage each other. When the jaws are in the latter position, a force component will be produced at the inclined surfaces which is acting in the axial direction and automatically increases the force with which the shiftable clutch member is pressed against the other clutch member.

It is thus another object of the invention to provide a friction clutch which does not require any special clutch springs and only requires the operator of the clutch to exert a very small force to shift and engage the gears.

A further object of the invention is to provide the jaws of such a clutch in such a symmetrical arrangement relative to each other that the torque may be transmitted and the clutch-engaging pressure be automatically increased or amplified in either direction of movement, and that the clutch may also be designed to act as a gear change clutch in which the slidable clutch member may be engaged with either of two different axially stationary clutch members depending upon the direction in which the slidable clutch member is shifted.

A further object of the invention is to provide a mechanism by means of which the automatic clutch-engaging or amplifying action according to the invention will be further supported and increased.

A feature of the invention for attaining this object consists in providing a looped conical torsion-coil spring on the shiftable clutch member which is operatively associated with an opposite conical surface on the axially stationary clutch member so as to engage these two members frictionally with each other simply by shifting such spring in an axial direction. The torque is then being transmitted not only by the pressure exerted by the looping coils of the spring, but also by the conical effect. Consequently, such a clutch may be of very short axial width which is a great advantage in gear transmissions for automobiles in which the individual gears to be engaged with their respective shafts should for lack of available space be mounted as close to each other as possible.

Another valuable feature of the invention consists in making the looped coil spring conical both at the outer and inner peripheries thereof, with the conical surfaces being inclined in opposite directions, and in mounting

2 such spring so as to cooperate with two corresponding conical surfaces on the other clutch member. Such a clutch may then be used to transmit the torque in either one or the other direction.

A clutch as designed according to the invention may be used especially for alternately engaging two shafts or gears with a third shaft. In such event, a looped coil spring may be non-rotatably connected with the clutch member which is connected with the third shaft and, if such spring is shifted axially in one or the other direction, it will engage with corresponding conical surfaces on the first or second shaft, or the first or second gear. A single looped coil spring will be sufficient for such purpose.

Another feature of the invention consists in making the cone angle of the looped coil spring slightly different from that of the other clutch member so that when the clutch is being shifted so as to move the spring in an axial direction, the spring will first come in contact with the conical surface of the other clutch member with its free end. Thus, the spring will slightly contract and insure that all its coils will participate in the embracing or engaging action and in transmitting the torque.

Further objects, features, and advantages of the present invention will appear from the following detailed description thereof, as well as from the accompanying drawing of a specific embodiment of the invention, in which Fig. 1 shows a partial longitudinal section through a gear transmission for an automobile in which two gears may be alternately engaged with a shaft by means of a clutch according to the invention;

Figs. 2*a* to 2*d* illustrate diagrammatically the different relative positions of the jaw of the new clutch as shown in Fig. 1 for transmitting the torque from the shiftable clutch member to the member carrying the same, and wherein Fig. 2*a* shows the jaws in their central position, Fig. 2*b* shows them in their intermediate position for engaging the first gear, Fig. 2*c* shows the position of the jaws when the first gear is engaged and the wheels of the automobile drive the engine, and Fig. 2*d* shows the position of the jaws when the first gear is engaged and the engine drives the wheels; while Figs. 3 and 4 show diagrammatically and somewhat overemphasized two examples of the cone angles of the looped coil spring and the other clutch member, respectively; the figures, however, indicating the size of the true angles relative to the horizontal which are preferably used according to the invention.

Referring to the drawings, and first particularly to Fig. 1, the transmission shaft 1 may be driven by the engine of the automobile in the usual manner and in the direction as shown by the arrow. Gears 2 and 3 which are secured to shaft 1 are constantly in mesh with two gears 4 and 5, respectively, which are loosely rotatable on the driven shaft 6. In the first gear, gear 5 should be engaged with shaft 6, while in the second gear, gear 4 should be engaged therewith. Shaft 6 carries an intermediate member 8 which is secured thereto by splines 7. This intermediate member 8 is provided on its outer periphery with diamond-shaped jaws 9 which are operatively associated with corresponding jaws 11 on the inside of a hub 10. A shifting ring 17 engages with a slide member 12 which is slidably mounted on a stationary rod 13 to shift the clutch toward the right or left from the central neutral position as shown in Fig. 1.

Shifting ring 17 is rigidly secured to a looped coil spring 14 which in turn is connected to hub 10. For the transmission of torsion, this connection is formed by the provision of teeth 15 at the inner periphery of spring 14 which engage with corresponding teeth on hub 10, while for an axial shifting movement, the connection is formed by means of a spring ring 16 which is mounted in slots provided both in spring 14 and in hub 10. Spring 14 is of conical shape in both axial directions and both on its outer and inner peripheries. The angle between the inner and outer conical surfaces of spring 14 should be slightly smaller, for example, by 30°, than the corresponding angle between the opposite conical surfaces in gears 4 and 5. By displacing a spring 14 of symmetrical cross section relative to the axis of symmetry of the opposed conical surfaces, as shown in Fig. 3, or by making spring 14, for example, of unsymmetrical cross section, as shown in Fig. 4, the first point of contact between the spring and the opposite clutch member will be formed during the clutch-engaging process only at the outer periphery of spring 14, as shown in Figs. 3 and 4, or only at the inner periphery thereof (not shown) so that spring 14 can press itself further into the space formed between the opposite conical surfaces.

The operation of the mechanism is as follows:

For engaging the first gear, ring 17 will be shifted toward the right. Claws 9 and 11 are then shifted relative to each other to the position shown in Fig. 2*b*, in which spring 14 does not as yet engage with gear 5. If ring 17 is then shifted a slight distance further to the right, the right end of spring 14 engages with the opposite conical surface in gear 5. Spring 14, which is wound so as to ascend toward the left, will be wound up by gear 5 which turns in the direction shown by the arrow, so that the outer conical surface will abut against the opposite conical surface of gear 5. Due to the resistance acting upon the driven shaft 6, jaws 9 and 11 will move to a rotary position substantially as shown in Fig. 2*d*, so that jaws 11 will tend to take along jaws 9. Due to their inclined contact surfaces, jaws 11 will at the same time be shifted axially toward the right so that the shifting movement will be automatically amplified, whereby spring 14 will be further pressed between the conical surfaces of gear 5 and be held in this position without requiring any force of the operator to do so.

The new clutch according to the invention employing a looped, coil spring may also be used for reversing the direction of transmission of the torque, as it may occur, for example, when the car runs down a hill in neutral, and when the first gear should then be engaged to act as a brake. In such event, gear 5 as shown in Fig. 1 is to be regarded as standing still, while shaft 6 is driven by the wheels of the car in the direction shown by the arrow. If, in this position, ring 17 is shifted axially toward the right, the resistance produced by the stopped engine will act upon shaft 1, and therefore also upon gear 5, and shift the jaws to the position as shown in Fig. 2*c*. Spring 14 will then curl in the opposite direction and be wound together so that its inner periphery will rest upon the inner conical surface of gear 5. The self-amplifying action of the shifting movement by means of the diamond-shaped jaws will then operate exactly as in the driving condition previously described.

For engaging the second gear, ring 17 must be shifted toward the left. The procedure is otherwise similar to that which occurs when ring 17 is shifted toward the right.

Spring 14 is preferably wound so that its coils abut against each other under an initial tension. This will insure that the conical surface of the spring will easily disengage from the opposed conical surface.

Also as shown in Figs. 3 and 4, the conical surfaces of spring 14 are preferably interrupted by grooves, serrations, screw threads, or the like so that the oil film which is formed between the conical surfaces will be mashed.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A clutch comprising an axially stationary clutch member including a first friction surface, a second clutch member including a second friction surface, means for shifting said second clutch member relative to said first clutch member for bringing said two friction surfaces into frictional engagement with each other, an axially stationary member for supporting said second clutch member and for transmitting a torque thereto, said two last members each having a plurality of jaws thereon adapted to interengage with each other, said jaws each having surfaces axially parallel to each other and merging with inclined surfaces thereon so that, when said clutch members are in disengaged position, said jaws engage each other with their axially parallel surfaces abutting each other, while in the engaged position of said clutch members, said jaws engage each other with their inclined surfaces abutting each other thereby urging said two friction surfaces into tighter engagement with each other.

2. A clutch as defined in claim 1, wherein each jaw includes two surfaces being parallel to a plane including the axis of said clutch members and at least two surfaces joining said parallel surfaces and being inclined toward each other, said parallel and said inclined surfaces providing means for transmitting a torque in one or the other direction.

3. A clutch as defined in claim 1, wherein each jaw includes two surfaces being parallel to a plane perpendicular to the axis of said clutch members and at least two surfaces joining said parallel surfaces and being inclined relative to each other.

4. A clutch as defined in claim 1, further comprising a looped conical coil spring on said shiftable clutch member, and a conical member on said axially stationary clutch member, said conical spring being adapted to cooperate and frictionally engage with said conical member when said clutch is in the engaged position.

5. A clutch as defined in claim 1, further comprising a looped conical coil spring on said shiftable clutch member having conical surfaces both at the inner and outer peripheries thereof and being inclined in opposite directions to each other, and a member on said axially stationary clutch member having two conical surfaces corresponding to the conical surfaces of said spring and adapted to be engaged thereby when said clutch is in the engaged position.

6. A clutch as defined 1, wherein an axially stationary clutch member is provided on each side of said shiftable clutch member, and said shiftable member is adapted to be alternately engaged with one of said first clutch members, further comprising a looped coil spring on said shiftable member having conical surfaces thereon, and a member on each of said second clutch members, having conical surfaces corresponding to the conical surfaces of said spring, said conical spring being adapted to engage with the conical surfaces of one of said first members when said clutch is in the engaged position.

7. A clutch as defined in claim 1, further comprising a looped conical coil spring on said shiftable clutch member, said conical spring being adapted to cooperate and frictionally engage with said conical member when said clutch is in the engaged position, and serrations on the inner periphery of said spring and on the outside of said supporting member, for non-rotatably connecting said spring to said supporting member.

8. A clutch as defined in claim 1, further comprising a looped conical coil spring on said shiftable clutch member, and a conical member on said axially stationary clutch member, said conical spring being adapted to cooperate and frictionally engage with said conical member when said clutch is in the engaged position, said spring having a slot at the inner peripheral surface thereof, said supporting member also having a slot in its outer surface, and a spring ring mounted on both of said slots for connecting said spring to said supporting member to prevent any relative movement between said spring and said supporting member in axial direction.

9. A clutch as defined in claim 1, further comprising a looped conical coil spring on said shiftable clutch member having conical surfaces both at the inner and outer peripheries thereof and being inclined in opposite directions to each other, and a member on said axially stationary clutch member having conical surfaces of slightly different inclination than the conical surfaces of said spring, so that when the clutch is being shifted into the engaged position, the free end of said spring will first come into contact with the conical surfaces of said axially stationary clutch member.

10. A clutch as defined in claim 1, further comprising a looped conical coil spring on said shiftable clutch member having conical surfaces both at the inner and outer peripheries thereof and being inclined in opposite directions to each other, and a member on said axially stationary clutch member having conical surfaces, said conical surfaces of said spring being disposed to the conical surfaces of said axially stationary member so that when said clutch is being shifted to the engaged position, the first point of engagement between said spring and the axially stationary clutch member will only be at one of said peripheries of said spring.

11. A clutch as defined in claim 4, wherein the coils of said spring abut each other under an initial spring tension.

12. A clutch as defined in claim 4, wherein the conical surfaces of said spring are interrupted by grooves or the like.

13. A clutch as defined in claim 9, wherein the cone angle of said spring is slightly smaller than the cone angle of the surfaces of said axially stationary clutch member.

References Cited in the file of this patent

UNITED STATES PATENTS

| | | |
|---|---|---|
| 824,805 | Muller | July 3, 1906 |
| 2,070,140 | Peterson et al. | Feb. 9, 1937 |
| 2,248,134 | Snow | July 8, 1941 |

FOREIGN PATENTS

| | | |
|---|---|---|
| 74,983 | Germany | July 27, 1893 |
| 1,113,174 | France | Nov. 28, 1955 |